United States Patent [19]
Passini

[11] Patent Number: 5,251,913
[45] Date of Patent: Oct. 12, 1993

[54] TRACK ROLLER FOR TRACKED VEHICLES

[75] Inventor: Ivano Passini, Fanano, Italy

[73] Assignee: Sorefa S.p.A., Fanano, Italy

[21] Appl. No.: 870,844

[22] Filed: Apr. 20, 1992

[30] Foreign Application Priority Data

Apr. 26, 1991 [IT] Italy .............................. B091U000073

[51] Int. Cl.⁵ .............................................. F16C 15/34
[52] U.S. Cl. .................................................... 277/92
[58] Field of Search ............... 384/420, 428, 537, 441, 384/130; 277/92, 85, 86

[56]     References Cited
U.S. PATENT DOCUMENTS 3,985,366  10/1976  Plouzek .................................. 277/92
4,883,370  11/1989  Nakanishi ............................. 384/537
5,094,550   3/1992  Momose et al. ..................... 384/420

Primary Examiner—Lenard A. Footland
Attorney, Agent, or Firm—Guido Modiano; Albert Josif

[57]     ABSTRACT

Sealed roller, particularly for tracked vehicles, including a supporting shaft which is inserted with a tight fit in respective blind bushes preset for fixing to a supporting structure, and a roller body rotatably supported about the shaft.

5 Claims, 1 Drawing Sheet

TRACK ROLLER FOR TRACKED VEHICLES

BACKGROUND OF THE INVENTION

The present invention relates to a track roller for tracked vehicles.

Track rollers are known which are composed of a shaft on which the actual roller turns with lubricated bearings interposed therebetween.

The opposite ends of the shaft are inserted in bushes which are externally provided with expansions in which bolts engage in order to fix the bushes to a supporting frame. The shaft is prevented from rotating by diametrical pins inserted in it through the bushes.

In order to provide a tight seal in the regions between the bushes and the opposite ends of the roller, sliding-ring gaskets, i.e. gaskets each composed of a pair of metallic rings which are pressed against one another, are provided. The axial force with which the rings of each pair are pushed toward one another is determined by the elastic deformation of respective rubber rings which are accommodated in seats defined in flanges of the bushes and in the roller.

Known rollers have the disadvantage that they are rather complicated from the point of view of construction and assembly; this complication is to be ascribed to the need to provide diametrical holes in the bushes and in the shaft for the passage of the pins and to provide seals between the shaft and the bushes in order to avoid the outward leakage of the lubricating oil of the bearings.

SUMMARY OF THE INVENTION

The technical aim of the present invention is therefore to provide a roller wherein the above described problems are substantially eliminated.

This aim is achieved, according to the present invention, with a track roller for tracked vehicles which is characterized in that the roller supporting shaft is inserted with a tight fit in respective blind bushes preset for fixing to a supporting structure.

BRIEF DESCRIPTION OF THE DRAWINGS

Further peculiarities of the present invention will become apparent from the following description of a preferred embodiment, illustrated only by way of non-limitative example in the accompanying drawing, wherein.

DESCRIPTION OF THE PREFERRED EMBODIMENTS

Figure 1:
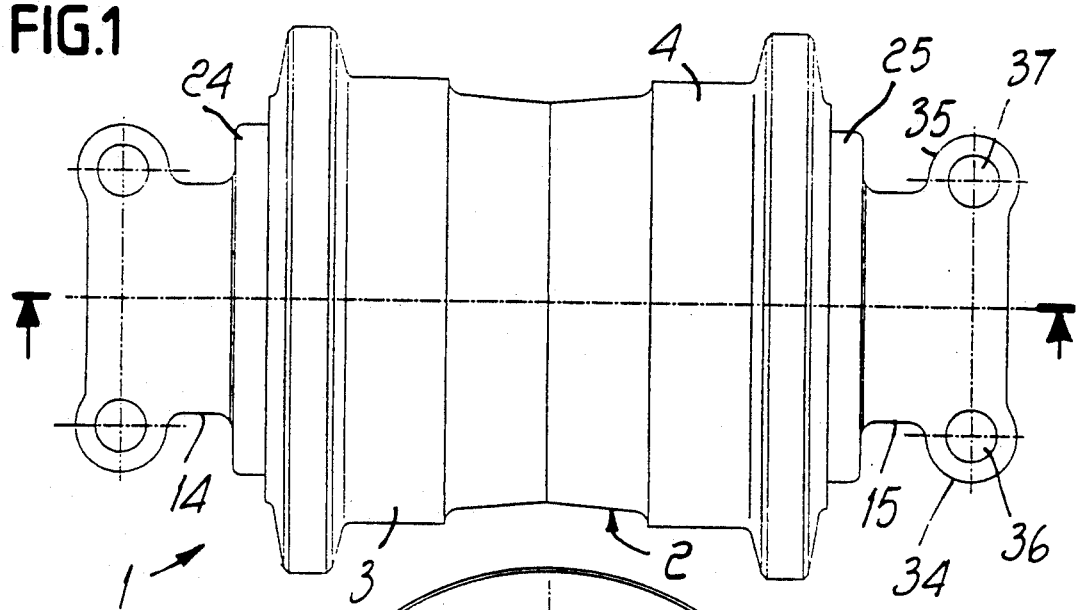
FIG. 1 is a side view of the track roller according to the present invention.
Figure 2:
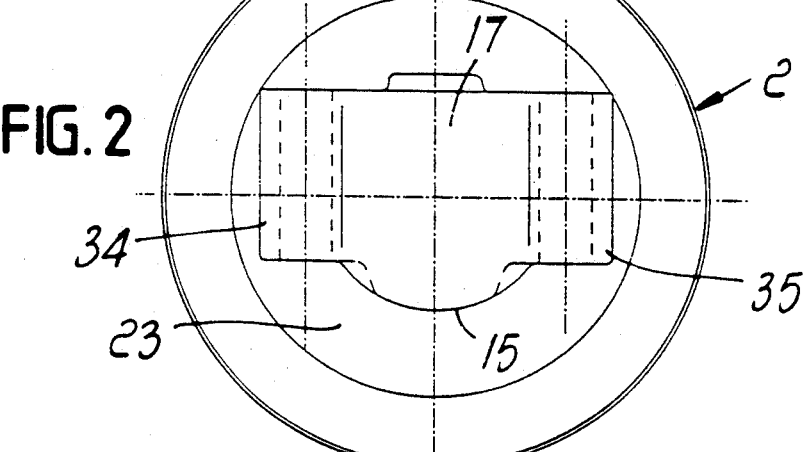
FIG. 2 is an axial view of said track roller.
Figure 3:
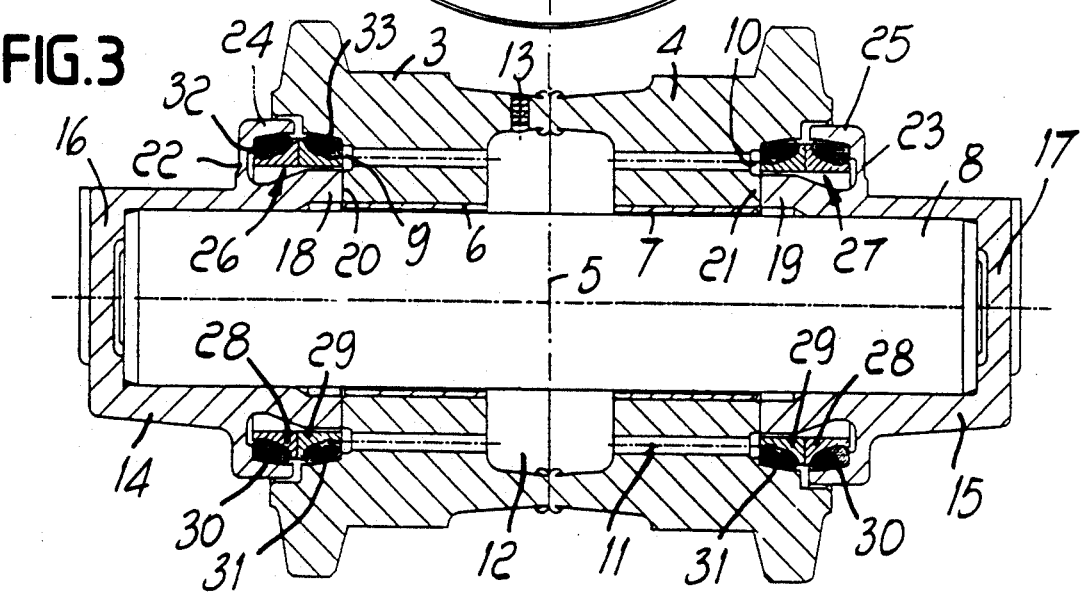
FIG. 3 is a sectional view, taken along the plane III—III of FIG. 1.

With reference to the above figures, the track roller is generally designated by the reference numeral 1 and comprises a roller body 2, which is composed of two halves 3 and 4 which are exactly specular and are welded by friction along the median plane 5.

The roller 2 is supported so as to be able to rotate about a perfectly cylindrical shaft 8 by means of a pair of bushings 6 and 7.

Two annular seats 9 and 10 are defined at the opposite ends of the roller and, by means of axial channels 11, are connected to a central cavity 12 of the roller 2 in which lubricating oil for the bearings 6 and 7 is introduced through a hole which is closed by a plug 13.

The opposite ends of the shaft 8 extend on both sides beyond the heads of the roller and are inserted with a tight fit in blind bushes 14 and 15, i.e. bushes which in practice have the shape of cups closed by bottoms 16 and 17.

The edges 18 and 19 of the bushes 14 and 15 which are directed toward the median plane 5 are flared and make sliding contact with shoulders 20 and 21 of the opposite heads of the roller 2 which protrude from the bottom of the seats 9 and 10.

The bushes are furthermore externally provided with flange 22 and 23 which define annular lips 24 and 25 which partially enter the seats 9 and 10 and close them with respect to the outside.

Two gaskets 26 and 27 are accommodated inside the seats 9 and 10 and prevent the outward leakage of the lubricating oil and at the same time prevent the penetration of dirt or other matter between the rotating parts.

Each gasket is composed of a pair of metallic rings 28 and 29 which have a substantially triangular cross-section and are arranged symmetrically with respect to a common plane of contact.

Respective rubber rings 30 and 31 are arranged peripherally with respect to said metallic rings 28 and 29 and rest externally on inclined surfaces 32 and 33 which are located inside the lips 24 and 25 and respectively circumscribe the seats 9 and 10.

The surfaces 32 and 33 converge and have such a diameter that when the bushes 14 and 15 are inserted on the shaft 8 the rings 28 and 29 are compressed. In this manner axial force components are produced which push the rings 28 and 29 toward each other, providing an oil-tight seal at the surface of contact, whereas tightness outside the rings 28 and 29 is provided by the rubber rings.

As can be seen, the described invention allows to achieve considerable structural simplification. In particular, the tight fit of the blind bushes 14 and 15 on the shaft 8 providing a sealing fixed coupling avoids the application of keying pins through said bushes and said shaft as well as the forming of annular grooves on the shaft in order to accommodate the sealing rings required to prevent axial leakages of lubricating oil.

The shaft 8 furthermore becomes significantly shorter, since it is no longer crossed by diametrical pins.

It should be noted that the bushes 14 and 15 are force-fitted until their bottoms 16 and 17 abut against the opposite ends of the shaft 8. In this manner the tight fit of the bushes 14 and 15 on the shaft 8 is sealed with respect to the environment and furthermore it is possible to determine exactly the axial plays between the edges 18 and 19 and the shoulders 20 and 21 and the thrusts by which the rings 28 and 29 are pushed toward one another.

The bushes can be conventionally provided with lateral expansions 34 and 35 which are rigidly associated with the bottoms 16 and 17 and are provided with holes 36 and 37 for the passage of bolts for mounting the roller onto a supporting structure.

I claim:

1. Roller for tracked vehicles, comprising a supporting shaft which is inserted with a tight fit in respective blind bushes which are adapted for coupling to a support structure whereby said shaft is fixedly coupled to said blind bushes in a sealed connection for preventing lubricant leakage, said sealed connection being further sealed by said blind bushes.

2. Roller according to claim 1, wherein the edges of said bushes which are directed toward the median plane of the roller are in sliding contact with shoulders of the opposite heads of the roller and are furthermore externally provided with flanges which define annular lips which engage the opposite heads of said roller, so as to close accommodation seats for gaskets which are suitable for preventing outward leakages of lubricating oil.

3. Roller according to claim 2, wherein said seats are connected to a central cavity of the roller by axial channels, lubricating oil being contained in said cavity.

4. Roller according to claim 2, wherein each gasket comprises a pair of metallic sliding rings, peripherally to which respective rubber rings are arranged and rest externally on inclined surfaces which are internal to said lips and delimit said seats, said surfaces converging so as to define, upon the compression of said rubber rings, axial thrusts which keep said metallic rings in mutual sealing contact.

5. Roller for tracked vehicles, comprising a supporting shaft which is inserted with a tight fit in respective blind bushes which are adapted for coupling to a support structure, said blind bushes having edges being directed toward a median plane of said roller, said roller further comprising at the opposite heads thereof respective shoulders, said shoulders being in sliding contact with said edges of said blind bushes, said blind bushes being force-fitted on said shaft until the bottoms thereof abut against the respective opposite ends of said shaft whereby determining the axial plays between said edges of said blind bushes and said shoulders of said roller.

* * * * *